July 2, 1929.  C. D. WOOD  1,719,038
PROCESS FOR THE PREPARATION OF SODIUM SILICATE SOLUTION
Filed May 26, 1927
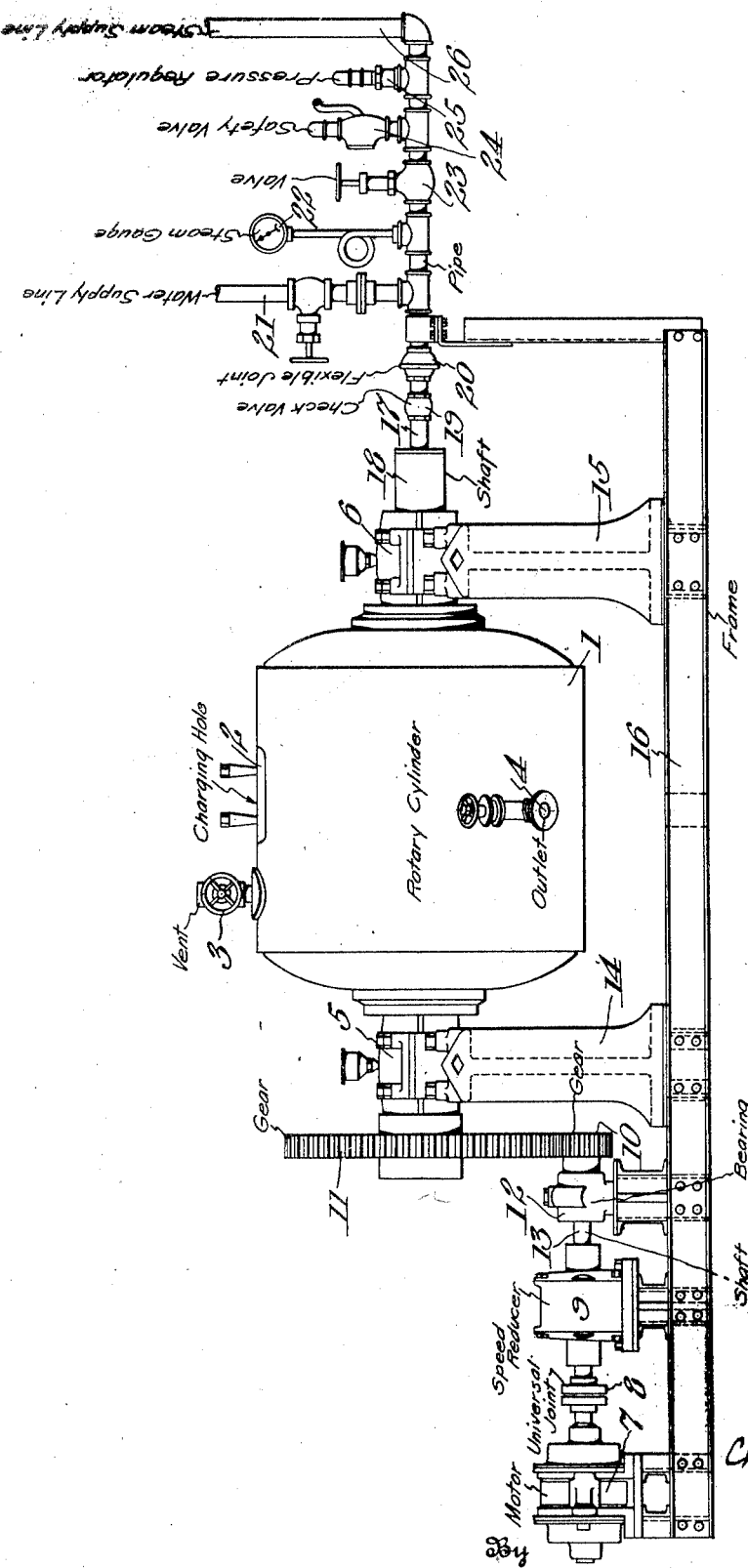

Patented July 2, 1929.

1,719,038

UNITED STATES PATENT OFFICE.

CHARLES D. WOOD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE.

PROCESS FOR THE PREPARATION OF SODIUM-SILICATE SOLUTION.

Application filed May 26, 1927. Serial No. 194,489.

The production of aqueous solution of sodium silicate from sodium silicate glass presents a number of difficulties which have made it impractical for small consumers to prepare their own solutions. Sodium silicate, therefore, usually is marketed in the form of its solutions, as a result of which freight rates are a vital factor in its cost to the consumers.

The usual grades of sodium silicate glass do not dissolve in water as easily as ordinary inorganic salts, such as sodium chloride or sodium sulfate, or organic products, such as cane sugar. As a matter of fact, if lumps of sodium silicate glass are boiled in water, they do not seem to dissolve at all.

When sodium silicate glass in lump form is treated with water and steam under pressure in stationary boilers provided with false bottoms, or open work baskets, it happens quite often, particularly when the conditions of temperature, steam pressure, time, etc., are not maintained under proper close control, that the lumps agglomerate into sticky or gummy masses which dissolve only very slowly or not at all. A gelatinous coating, which itself is insoluble, forms on the lumps causing them to agglomerate and effectively preventing the water from reaching the interior of the lumps. Circulation of the liquor and even agitation, is well nigh impossible in such dissolvers due to the high viscosity of the silicate solution and to the formation of such gummy, sticky masses, which are usually called "stickers". The dissolvers, moreover, due to the lack of agitation, contain strata of solution of different concentrations which prevent accurate sampling and determination of the average concentration. It has always been customary to carry in the dissolvers a surplus of glass to hasten dissolving and the production of solution of the desired concentration. This excess of glass, however, gives rise to variations of concentration in the successive batches of solution produced unless the concentration is carefully checked by frequent tests and controlled.

I have now devised a simple and inexpensive method requiring no highly skilled operation or supervision whereby sodium silicate glass of all commercial grades is easily dissolved in water to the production of solutions of predetermined concentration.

My method or process consists essentially in introducing a charge of sodium silicate glass preferably in the form of relatively small lumps into a rotary cylinder or equivalent agitating and mixing device, adding the required amount of water, heating the contents of the drum to the development of a superatmospheric steam pressure therein, for instance, by the introduction of live steam, and revolving the drum while maintaining said pressure until the silicate is dissolved. The charge then may be blown from the cylinder under its own pressure into the bottom of a storage tank, from which the solution is drawn off as required. Incidental to the development of the method, I have devised an apparatus suitable for carrying out the method, the construction and operation of which will be described in connection with the accompanying drawings in which the figure is a vertical elevation of the rotary cylinder and its associated mechanism.

Referring to the drawing, the rotary cylinder 1 has a charging hole 2, a vent 3, and a valved outlet 4 and is mounted on bearings 5 and 6 to be rotated by means of the motor 7 acting through the universal joint 8, speed reducer 9 and gears 10 and 11 at a rate of, for instance, 5 to 10 revolutions per minute. 12 is a bearing for the power shaft 13. Bearings 5 and 6 are carried by suitable supports 14 and 15, the whole assembly being mounted on the frame 16 which may be provided with wheels or rollers so as to be easily portable. The pipe 17 communicates with the interior of the cylinder 1 through the hollow shaft 18 and through the check valve 19 and flexible joint 20 with the valved water supply line 21 and steam gage 22 and thence through the valve 23 with the safety valve 24, pressure regulator 25 and steam supply line 26. The cylinder 1 preferably is provided with baffle plates (not shown), for instance, three equally spaced plates extending the entire length of the cylinder, to promote the agitation of the contents. The cylinder may be of any suitable size, say about 4 feet long and about 4 feet in diameter and made of any suitable material. A suitable operating pressure is about 60 pounds pressure per square inch. The operation of the apparatus is obvious from the foregoing description.

Assuming that the water glass and water are charged into the cylinder in proportions within the range of the solubility of the silicate which may include solutions of concentrations ordinarily used in trade, the silicate is rapidly and practically completely dissolved leaving no residue in the cylinder and eliminating the prior practice referred to of using an excess of silicate. Consequently, each batch of silicate solution may, by proper control of the quantities of silicate and water added to the cylinder, be made of very uniform and predetermined strength thereby eliminating the frequent testing required in the prior process referred to. No formation of stickers occurs even with silicate glass containing relatively large quantities of insoluble impurities, such as silicates of calcium, magnesium, iron, etc. The only effect of the size of the lumps of silicate supplied to the dissolver is to vary the time required for complete dissolving, large lumps requiring a longer time than smaller lumps. Due to the thorough agitation which occurs in the cylinder there is no stratification of the solution such as occurs in the prior process referred to. In making silicate solution of a predetermined concentration from a uniform supply of silicate glass all conditions may be standardized including even the time required for operation upon each batch. The exact operating conditions will of course vary to some extent depending upon the properties of the silicate glass, for instance its alkalinity, the size of the lumps, the concentration of solution to be prepared, the pressure employed in the cylinder and even to some extent upon the shape and size of the cylinder and atmospheric conditions, but practically all of these conditions may be standardized and homogeneous solutions of predetermined concentration in successive batches produced. The amount of steam condensed in the cylinder must be taken into account but this factor may be eliminated by heating the cylinder, for instance, by means of a steam jacket, instead of by injecting steam into the cylinder.

In a typical operation in apparatus of the construction and size described involving the use of about 1400 pounds of sodium silicate glass, 1770 pounds of water, steam pressure of 60 pounds and revolving the cylinder at the rate of 5 to 10 revolutions per minute, requires about 90 minutes' operation to produce complete solution of the silicate.

As stated above the process is adapted to be carried out in batch operation in a relatively small dissolving apparatus which may be portable and the resulting batches of silicate solution may be delivered under their own pressure into a storage vessel. The storage vessel preferably is of sufficient size to hold a plurality of batches of the solution produced in the dissolver, and the solution preferably is introduced into the storage vessel near the bottom so that its entrance under the pressure in the dissolver produces agitation and mixing of the contents of the storage vessel. In this way any variation in the composition of succeeding batches of solution produced in the dissolver may be largely equalized and the solution in the storage vessel is maintained at a uniform and homogeneous composition. A portable dissolving apparatus obviously may advantageously be used to supply a plurality of storage vessels at separated points in a manufacturing plant.

I claim:

Process for the production of sodium silicate solution from sodium silicate glass, which comprises agitating successive batches of a mixture of sodium silicate glass and water under superatmospheric steam pressure and at a corresponding temperature in a closed rotary cylinder until the glass is substantially completely dissolved and delivering the successive batches of the resulting sodium silicate solution from said cylinder by the force of said pressure into the bottom of a storage vessel capable of holding a plurality of said batches.

In testimony whereof, I affix my signature.

CHARLES D. WOOD.